US007193638B2

(12) United States Patent
Mizes et al.

(10) Patent No.: US 7,193,638 B2
(45) Date of Patent: Mar. 20, 2007

(54) SYSTEMS AND METHODS FOR SENSING SKEW AND BOW OF A RASTER OPTICAL SCANNER USING A FULL WIDTH ARRAY DETECTOR

(75) Inventors: Howard A. Mizes, Pittsford, NY (US); Peter Paul, Webster, NY (US); Stanely J. Wallace, Victor, NY (US); Michael D. Borton, Ontario, NY (US); Kenneth R. Ossman, Macedon, NY (US)

(73) Assignee: Xerox Corporation, Stamford, CT (US)

( * ) Notice: Subject to any disclaimer, the term of this patent is extended or adjusted under 35 U.S.C. 154(b) by 294 days.

(21) Appl. No.: 10/998,986

(22) Filed: Nov. 30, 2004

(65) Prior Publication Data

US 2006/0114308 A1 Jun. 1, 2006

(51) Int. Cl.
*G06K 9/00* (2006.01)
*G03G 21/00* (2006.01)

(52) U.S. Cl. .................................... 347/116; 399/301

(58) Field of Classification Search ................ 347/116, 347/235, 250; 399/301
See application file for complete search history.

(56) References Cited

U.S. PATENT DOCUMENTS

2006/0114282 A1 * 6/2006 Mizes et al. .................. 347/19
2006/0114283 A1 * 6/2006 Mizes et al. .................. 347/19

* cited by examiner

*Primary Examiner*—Huan Tran
(74) *Attorney, Agent, or Firm*—Oliff & Berridge, PLC

(57) ABSTRACT

System and methods are provided for detecting color separation misalignment in raster optical scanners. A dash minimum response curve is obtained from a plurality of minimal responses sensed from a plurality of dashes in a test pattern. The frequency of the dash minimum response curve a is used to detect skew or bow, depending on whether the frequency is a constant or a variable.

20 Claims, 8 Drawing Sheets

SYSTEMS AND METHODS FOR SENSING SKEW AND BOW OF A RASTER OPTICAL SCANNER USING A FULL WIDTH ARRAY DETECTOR

BACKGROUND OF THE INVENTION

1. Field of Invention

This invention relates to systems and methods for sensing skew and bow of a raster optical scanner (ROS) using a full width array detector.

2. Description of Related Art

Some color printers have an architecture that uses 4 raster optical scanner images for 4 color separations. The raster optical scanners need to be precisely aligned.

When the raster optical scanners are precisely aligned, the color separations will lay on top of each other to produce high quality color images.

SUMMARY OF THE INVENTION

When the raster optical scanners are not precisely aligned, one color separation will not exactly lay on top of the other color separations. This will cause color shifts, blurring of color text, and other problems in color images.

Raster optical scanner misalignments include ROS skew and ROS bow. ROS skew and ROS bow occur when the beam of the scanner does not sweep perpendicularly across a photoreceptor in a straight line. In particular, skew occurs when the beam of the scanner sweeps across the photoreceptor at an angle. Bow occurs when the beam takes a curve path across the photoreceptor.

Various exemplary systems and methods according to this invention provide sensing and detection of raster optical scanner skew and bow using a full width array detector or sensor.

In various exemplary embodiments, a method for detecting color separation misalignment of a raster optical scanner comprises obtaining a dash minimum response curve based on a plurality of responses having minimal values sensed from a plurality of dashes in a test pattern, the plurality of dashes in the test pattern being spaced from each other at a substantially equal distance across the process direction of the printer, each dash extended substantially the same length in the process direction, at least one dash having a position shift in the process direction from a neighboring dash; obtaining a frequency of the dash minimum response curve; and determining whether the frequency is a constant and at it's specified value.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
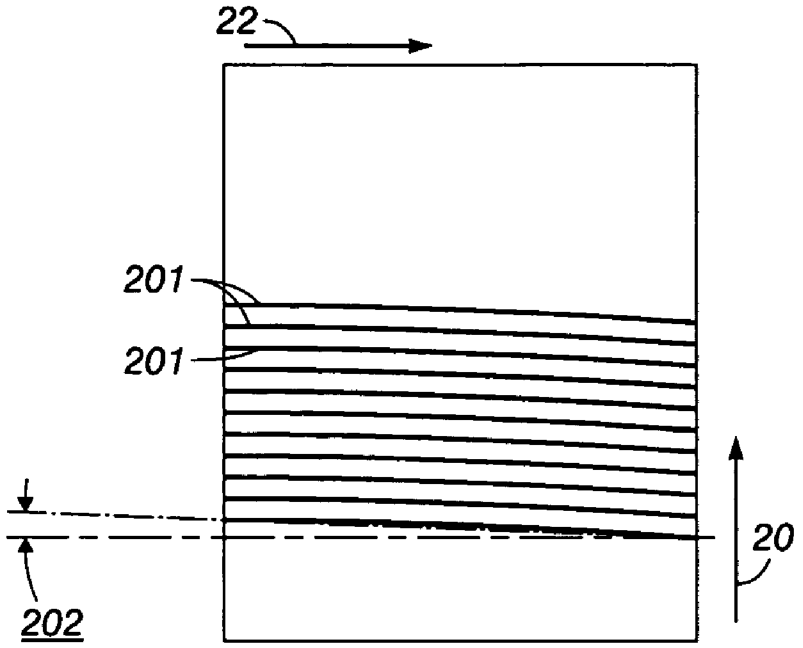
FIG. 1 illustrates an exemplary raster optical scanner skew.

FIG. 1 illustrates an exemplary raster optical scanner skew. As shown in FIG. 1, skew occurs when the scan lines 201 are at an angle, such as a small angle 202, relative to the cross process direction 22. In a raster optical scanner skew, the angle 202 is typically a constant.

Figure 2:
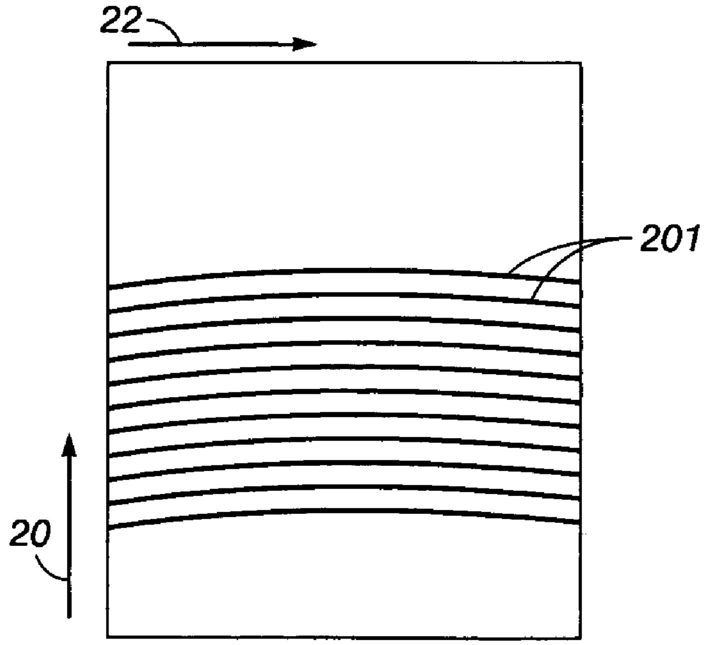
FIG. 2 illustrates an exemplary raster optical scanner bow.

FIG. 2 illustrates an exemplary raster optical scanner bow. As shown in FIG. 2, bow occurs when the scan lines 201 are curved across the process direction 20. In particular, bow occurs when the scan lines 201 are at an angle relative to the cross process direction 22, and the angle varies. In the example shown in FIG. 2, the scan lines 201 are oriented slightly against the process direction with a positive angle near the left hand side of FIG. 2, are perpendicular to the process direction at the mid portion of FIG. 2, and are oriented slightly with the process direction in the right hand side portion of FIG. 2. Thus, the bow in FIG. 2 is generally bell-shaped, with the angle decreasing from the left hand side portion to the right hand side portion. In particular, the angle with respect to the cross process direction varies from a positive value at the left hand side portion, down to zero in the middle portion, and down to a negative value at the right hand side portion.

Difference raster optical scanner may bow in the opposite direction. For example, a bow may be U-shaped, with the angle increasing, instead of decreasing, from a negative value to zero, and then to a positive value. In particular, the scan lines may be oriented slightly with the process direction at the left hand side portion, be perpendicular to the process direction in the middle portion, and be oriented slightly against the process direction at the right hand side portion.

Raster optical scanner bows may have higher order of distortion. The angle of the path the beam takes with respect to the process direction can take on both positive and negative values as a function of cross process position. For example, the beam angle plotted as a function of cross process position may contain both a bell-shaped and U-shaped portions. For example, the angle may start at a positive value, decrease to zero, continue decreasing to a negative value, begin increasing until reaching zero again, and increase to another positive value. In such a raster optical scanner bow having higher order of distortion, the scan lines "wave" in the cross process direction.

Figure 3:
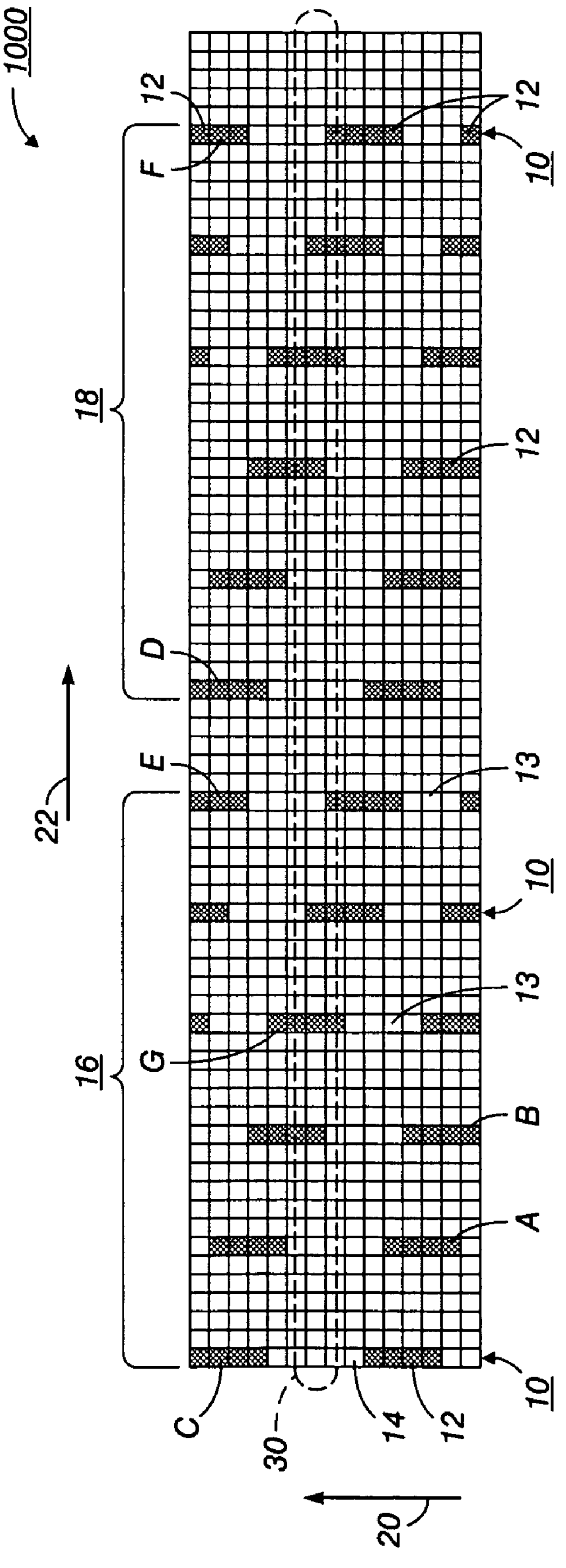
FIG. 3 illustrates an exemplary embodiment of a test pattern according to this invention.

FIG. 3 illustrates an exemplary embodiment of a test pattern 1000 according to this invention. As shown in FIG. 3, the test pattern 1000 may include a plurality of dashed lines 10. Each dashed line 10 extends in the process direction 20 (the vertical direction or y-axis direction). The plurality of dashed lines 10 are substantially equally spaced or separated from each other in the cross process direction 22 (horizontal direction, or x-axis direction).

As shown in FIG. 3, each dashed line 10 includes a plurality of dashes 12 running in the process direction 20. The dashes 12 of a dashed line 10 are substantially equally spaced or separated from each other in the process direction 20.

As shown in FIG. 3, a dash 12 in a dashed line 20 is shifted for a certain number of pixels 14 in the process direction 20 relative to a dash 12 of a neighboring dashed line 10. For example, as shown in FIG. 3, dash A is ahead of dash B in the process direction 20. The shift may be any number of pixels. For example, as shown in FIG. 3, dash A is one pixel ahead in the process direction 20 than dash B.

As shown in FIG. 3, the test pattern 1000 periodically repeats the configuration of a plurality of dashed lines 10 in the cross process direction 22. For example, as shown in FIG. 3, dashed line groups 16 and 18 have similar configuration. In particular, dashes C and D are located at substantially the same process direction location. Dashes E and F are also located at substantially the same process direction location.

In various exemplary embodiments, the dashes 12 are spaced far enough apart in the cross process direction 22 (x-axis direction) so that they can be distinguished by a full width array sensor. The dashes 12 are long enough in the process direction 20 (y-axis direction) so that end effects do not affect the shape of the dashes 12 as detected by the sensor.

Each dashed line 10 includes periodical occurrences of dashes 12 and gaps 13. A gap 13 is the separation between two dashes 12 in the process direction 20. In various exemplary embodiments, the dash/gap (or on/off) period is designed for adequate raster optical scanner misalignment detection, as discussed in greater detail below. In the exemplary test pattern shown in FIG. 3, the length of the dashes is 4 pixels, and the gap between two dash lines is 4 pixels.

As shown in FIG. 3, a cross section 30 running across the test pattern 1000 in the cross process direction 22 goes through the dashed lines 10. The cross section 30 may intersect a dashed line 10 within a gap 13 between the dashes 12 of the dashed line 10. The cross section 30 may also intersect a dashed line 10 within a dash 12 of the dashed line 10. In addition, the cross section 30 may intersect a dashed line 10 at a tip or end of a dash of the dashed line 10. As will be discussed in greater detail below, a sensor response profile along the cross section 30 will have a maximal, minimal or intermediate value at a particular x-axis position depending on whether the cross section 30 intersects a dashed line 10 located at the particular x-axis position within a gap between the dashes, within a dash, or at a dash tip of the dashed line.

In various exemplary embodiments, a full width array sensor is used to detect skew and bow. In various exemplary embodiments, an in situ full width array sensor is used. The full width array sensor detects the toner on the photoreceptor to enable the potential to measure skew and bow. In various exemplary embodiments, the full width array sensor is a contact image sensor with a row elements running completely across the process direction, an illumination source, and a set of graded index cylindrical lenses that focuses the image of the toned photoreceptor onto the sensors. In various other exemplary embodiments, the full width array sensor is linear array remote from the drum with an illumination source and reduction optics that focus the full width of the drum row onto the linear array sensor.

In various exemplary embodiments, a common integration time technique is used for gathering full width array sensor data. In such exemplary embodiments, the sensor responses are clocked out individually so that the reflectance of a set of points parallel to the axis of the rotation of the drum are read.

In various other exemplary embodiments, a sequential integration time technique is used for gathering full width array sensor data. In such exemplary embodiments, each sensor is clocked out in sequence, so the drum rotates or the belt moves some distance between the first read and the last read. This may have the effect of reading along a line rotated at some angle with respect to the cross process direction. With knowledge of the read time, the test pattern and the analysis thereof may be used for subsequent adjustment.

The presence of dashes changes sensor response. In particular, the presence of toner on the photoreceptor can either decrease or increase the response of sensors, depending on the relative colors and texture of the toner and the photoreceptor. For the ease of discussion, it is assumed that the presence of toner decreases sensor response. However, it should be appreciated that the discussion below also applies when the presence of toner increases sensor response.

In various exemplary embodiments, as will be described in greater detail below in connection with FIG. 3, a sensor response profile is obtained from a cross section along the cross process direction of a test pattern. As discussed above, the strength of the response at a particular cross process direction location in the response profile depends on whether the cross section intersects with a dashed line at the particular cross process direction location, and if the cross section intersects with a dashed line, whether the cross section intersects the dashed line between the dashes, within a dash, or at a dash tip of the dashed line. In particular, the strength or magnitude of the response in the response profile will reach a maximum at the particular cross process direction location if the cross section does not intersect a dashed line at the cross process direction location, because there is no dash to decrease the sensor response. Similarly, if the cross section intersects with a dashed line at the particular cross process direction location, but the cross section intersects with the dashed line between the dashes of the dashed line, the strength of the response at the cross process direction will still be close to the maximum response strength because there is no dash at the intersection to decrease the sensor response. However, if the cross section intersects the dashed line within a dash of the dashed line, the response strength will be a minimal, because the presence of the dash decreases the sensor response. When the cross section intersects the dashed line at a dash tip, the presence of the dash within the cross section is not complete. The decrease in sensor response will be reduced. Accordingly, the strength of the response will be at an intermediate magnitude between the maximum and the minimum.

In particular, as shown in FIG. 3, a cross section 30 is used to indicate where a sensor detects dashes. In various exemplary embodiments, a cross section of sensor response is used to detect errors in a printed image. The cross section of the sensor response is a collection of profiles through the dashes in the test pattern. A profile includes sensor response along the cross process direction at a particular process direction location. In various exemplary embodiments, the cross section is a collection of profiles through all the dashes in a test pattern. In various other exemplary embodiments, the cross section is a collection of profiles through the dashes in part of the test pattern.

In a response profile of a cross section of sensor response, sensor response varies along the cross process direction. As discussed above and shown in FIG. 3, a sensor response profile along the cross section 30 will have a maximal, minimal or intermediate value at a particular x-axis position depending on whether the cross section 30 intersects a dashed line 10 located at the particular x-axis position within a gap between the dashes, within a dash, or at a dash tip of the dashed line. In particular, sensor response highs, or maxima, occur at locations corresponding to positions where dashes do not exist, such as the gaps between dashes. For example, as shown in FIG. 3, at the x-axis position where the dashed line containing dash A is located, the sensor response on the cross section 30 will be relatively high because the cross section 30 intersects this dashed line at a gap between the dashes of this dashed line. There is no dash at the intersection to decrease the sensor response, and the sensor response will be a high or maximum.

On the other hand, at the x-axis position where the dashed line containing dash G is located, the sensor response on the cross section 30 will be relatively low because the cross section 30 intersects this dashed line within a dash of this dashed line. The dash at the intersection decreases the sensor response, and the sensor response will be a low or minimum.

Furthermore, at the x-axis position where the dashed line containing dash B or E is located, the sensor response on the cross section 30 will be between the high and low values discussed above, because the cross section 30 intersects this dashed line at a dash tip.

The positions of the lows (minima) are used to obtain the locations of the corresponding dashes.

Figure 4:
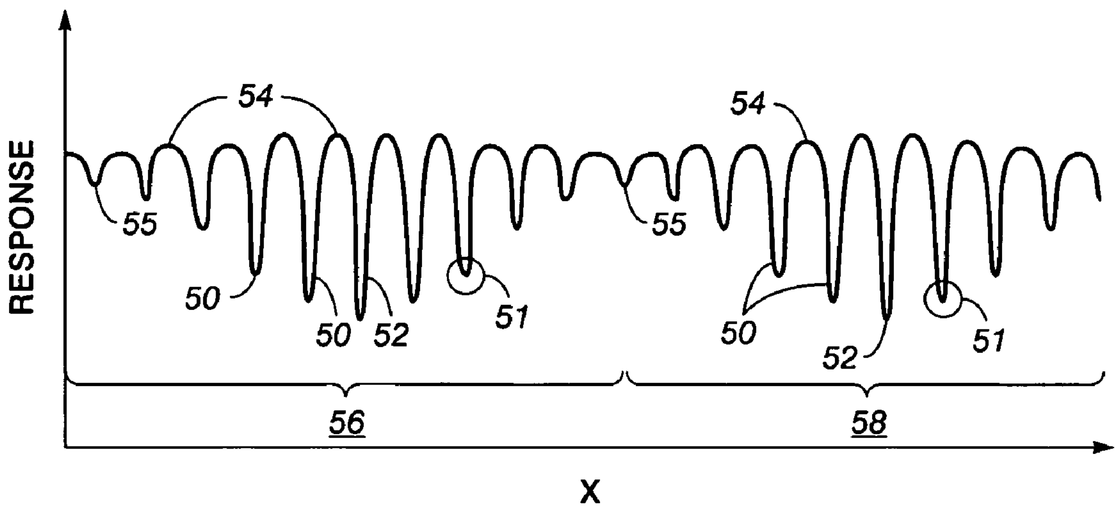
FIG. 4 illustrates an exemplary embodiment of a sensor response profile according to this invention.

FIG. 4 illustrates a sensor response profile obtained from a cross section in the test pattern of FIG. 3. As shown in FIG. 4, the profile generally maintains a constant magnitude across the cross process direction (x-axis direction). However, the response profile is attenuated 50 at regular intervals. The magnitude of the attenuation varies. The magnitude of the attenuation increases along the x-axis from that of the smallest attenuation 55 to that of the largest attenuation 52, then decreases to that of the smallest attenuation 55.

The regions of attenuation 50 are located on the x-axis corresponding to the locations of the dashed lines 10 in FIG. 3. Each attenuated region 50 indicates a reduction of response strength due to the presence of a respective dashed line that decreases the sensor response. Each attenuated region has a dash minimum response 51 that identifies how maximum degree of attenuation caused by that particular dash.

As discussed above, the presence of a dashed line in the cross section decreases the sensor response differently, depending on whether the cross section intersects with the dashed line between dashes, within a dash, or at a dash tip of the dashed line. Such a variation in sensor response reduction is reflected in FIG. 4. As shown in FIG. 4, the largest attenuations 52, indicating maximal sensor response reduction and minimal sensor response, appear at x-axis locations corresponding to the dashed lines with which the cross section intersects within dashes. The locations with gaps 54 between the attenuated regions 50, indicating minimal sensor response reduction and conformity to the constant response magnitude, appear at x-axis locations corresponding to dashed lines with which the cross section intersects within the gaps between dashes. The other, smaller attenuated regions with intermediate length, indicating intermediate sensor response reduction and representing intermediate sensor response magnitude, appear at x-axis locations corresponding to dashed lines with which the cross section intersects at dash tips.

As shown in FIG. 4, the response profile periodically repeats the characteristics of a group of attenuated regions. For example, the profile portion 56 is similar to the profile portion 58. This corresponds to the periodical configuration of dashed line groups 16 and 18, as shown in FIG. 3.

In various exemplary embodiments, registration errors are detected using a metric of the response profile in FIG. 4. The metric represents one or more of a minimal attenuation, the full width half maximum of the attenuated region, and the integral of the attenuated region.

Figure 5:
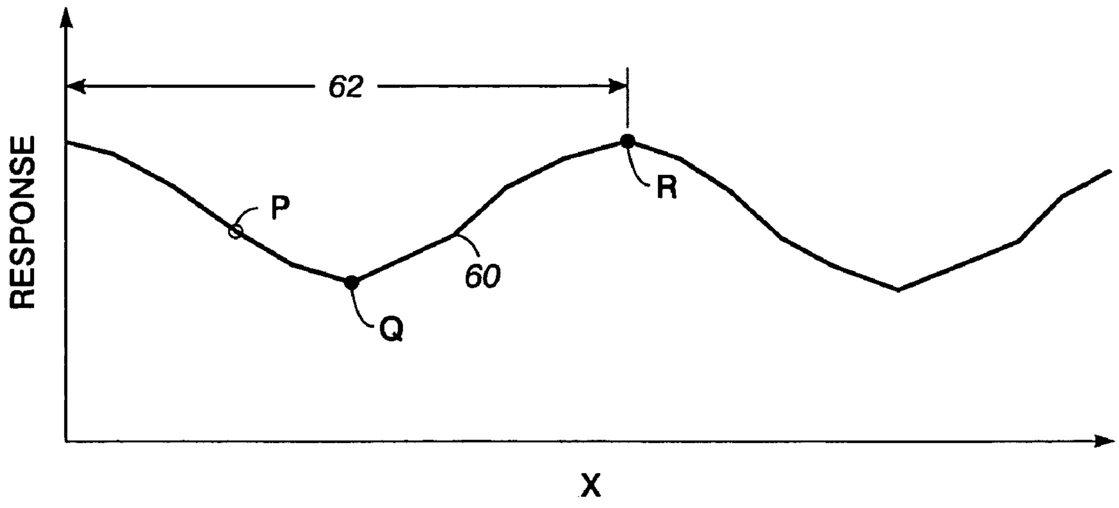
FIG. 5 illustrates an exemplary embodiment of a dash minimum response curve according to this invention.

FIG. 5 illustrates the dash minimum response curve 60 that is a vector of the metrics (described in paragraph 49) of the each attenuated profile in FIG. 3. As shown in FIG. 5, the curve 60 is substantially sinusoidal. The wavelength 62 of the dash minimum response curve 60 corresponds to the distance extended by a dashed line group 16, 18, as shown in FIG. 3, in the test pattern 1000. In various exemplary embodiments, the wavelength of the dash minimum response curve 60 may be used to determine the frequency of the curve.

For a particular point on the dash minimum response curve 60 in FIG. 4, such as point P, the location on the x-axis corresponds to the x-axis location of a respective dashed line 10 in FIG. 3. The amplitude of this point correlates with the magnitude of the attenuation 50 in FIG. 4, which indicates the amount of sensor response reduction caused by the respective dashed line 10 in FIG. 3. For example, point Q corresponds to a dash sequence that causes maximum attenuation 52 in FIG. 4. Point R corresponds to dash sequence that causes minimum attenuation 55 in FIG. 4.

In various exemplary embodiments, the frequency of the dash minimum response curve is used in detecting skew and bow. When the ROS has skew or bow, the sweep of the ROS beam will not be exactly perpendicular to the process direction. Horizontal lines in an image may have a slight curvature, which would be imperceptible for a black and white printer would lead to registration errors for a color printer. The curvature of the ROS beam will cause a change in the frequency of the dash minimum response curve produced from the response profile sensed from the dashed lines.

In various exemplary embodiments, each dashed line 10 in FIG. 3 is assigned a dashed line index based on the x-axis position of the dashed line. Accordingly, the x-axis in FIG. 4 may be replaced by dashed line indices, and the dash minimum response curve 60 in FIG. 4 may be expressed as a function of dashed line indices, as shown in FIG. 6.

Figure 6:
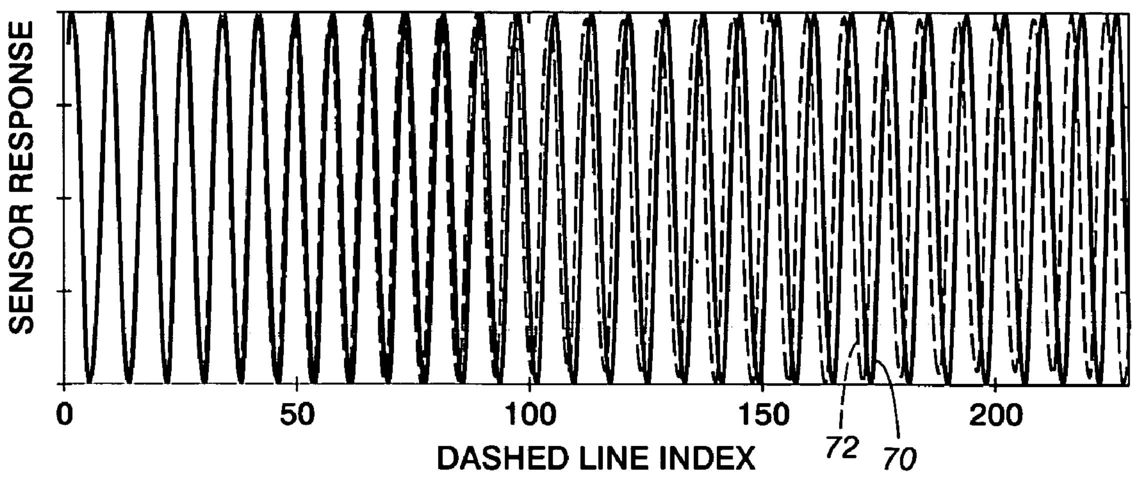
FIG. 6 illustrates a comparison between a measured dash minimum response curve and a reference dash minimum response curve according to this invention.

FIG. 6 shows two dash minimum response curves 70 and 72. Each of the two curves 70 and 72 plot the degree of attenuation caused by each dash sequence of a sensor response profile, similar to the curve 60 in FIG. 5, except that the curves 70 and 72 are expressed in the dashed line indices domain. The first dash minimum response curve 70 (the black curve) represents a dash minimum response curve expected from a perfectly aligned ROS, and the second dash minimum response curve 72 (the gray curve) represents a dash minimum response curve measured from a test pattern produced by a ROS with skew.

In various exemplary embodiments, the first dash minimum response curve is obtained from an aligned ROS, a simulated test pattern, or mathematical calculations.

As shown in FIG. 6, the first dash minimum response curve 70 has a longer wavelength, or higher frequency, than the second dash minimum response curve 72. The frequency difference between the first and second dash minimum response curves indicates skew. The skew direction is such that the frequency of the dash minimum response curve increases. The magnitude of the change in frequency indicates the amount of skew (skew angle).

In various exemplary embodiments, the frequency change is determined using standard fast Fourier transform. When the changes are less than the frequency resolution of standard fast Fourier transform, various digital signal processing techniques are used to measure such small changes in frequency. In various exemplary embodiments, the small changes in frequency are determined using Chirp Z-Transform.

In various exemplary embodiments, the changes in frequency are determined by comparing the frequency of the second dash minimum response curve with an expected frequency determined from the design of the test pattern of dashes. In such exemplary embodiments, the first dash minimum response curve need not be produced. Instead, a reference may be used for comparing with a measured frequency. In various exemplary embodiments, the reference may be a reference constant frequency. A measured frequency that is a constant indicates skew.

Figure 7:
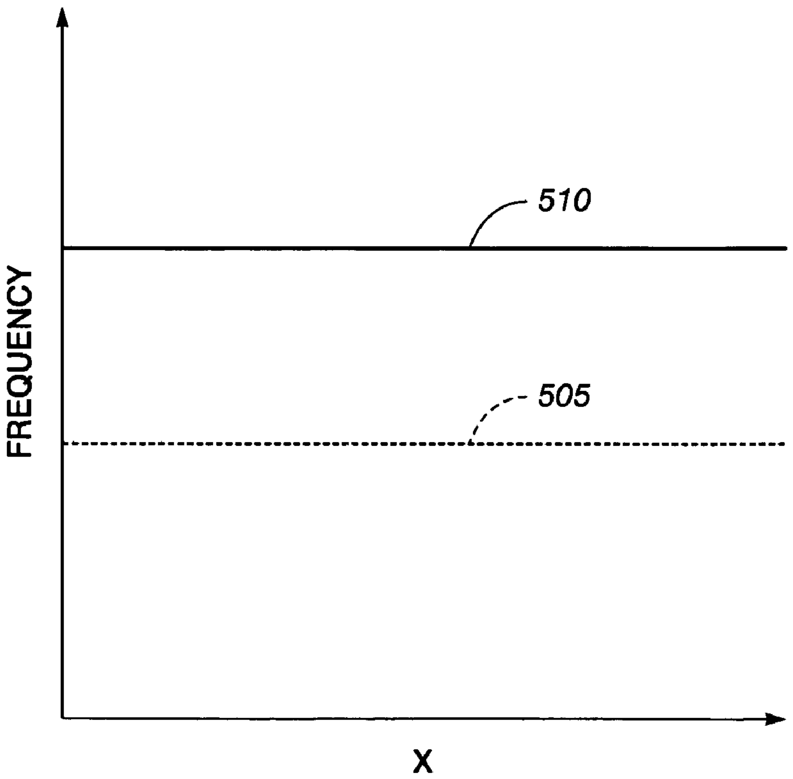
FIG. 7 illustrates a comparison between a measured frequency and a reference frequency as a function of cross process position according to this invention.

FIG. 7 illustrates a comparison between the measured constant frequency 510 and the reference constant frequency 505. The x-axis may be dash line indexes, or may be actual x-axis location of the dash lines. In FIG. 7, the reference constant frequency 505 may be obtained from a reference dash minimum response curve, or may be a predetermined value. The measured constant frequency 510, being different from the reference constant frequency 505, indicates skew.

In various exemplary embodiments, the difference between the measured constant frequency 510 and the reference constant frequency 505 may be used to determine the degree of raster optical scanner skew. In FIG. 7, the measured constant frequency 510 is larger than the reference constant frequency 505. However, the measured constant frequency may also be smaller (not shown) than the reference constant frequency. Whether the measured constant frequency 510 is larger or smaller than the reference constant frequency 505 depends on the direction of the skew, or whether the angle of the skew is a positive or negative value. The magnitude of the difference between the measured constant frequency 510 and the reference constant frequency 505 indicates the degree of raster optical scanner skew.

When raster optical scanner bow occurs, the measured frequency is a variable, as will be discussed in greater detail below in connection with FIGS. 8–10. The measured frequency decreases, increases, or fluctuates, depending on whether the bow is curves in the process direction, curves against the process direction, or curves towards or against the process direction depending on the cross process position. In various exemplary embodiments, the variation of the measured frequency is analyzed and used in determining raster optical scanner bow.

Figure 8:
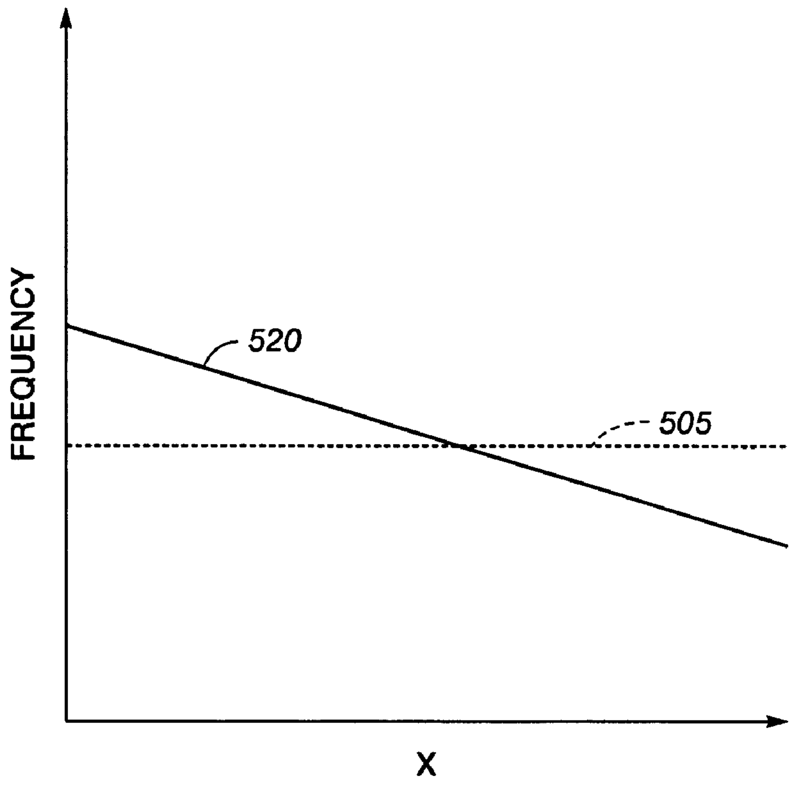
FIG. 8 illustrates another comparison between a measured frequency and a reference frequency as a function of cross process position according to this invention.

FIG. 8 illustrates a comparison between a measured frequency 520 with a reference constant frequency 505. As shown in FIG. 8, the measured frequency 520 decreases from a value larger than that of the reference constant frequency 505 to a value smaller than that of the reference constant frequency 505. Such a measured decreasing frequency corresponds to a bell-shaped bow as shown in FIG. 2.

Figure 9:
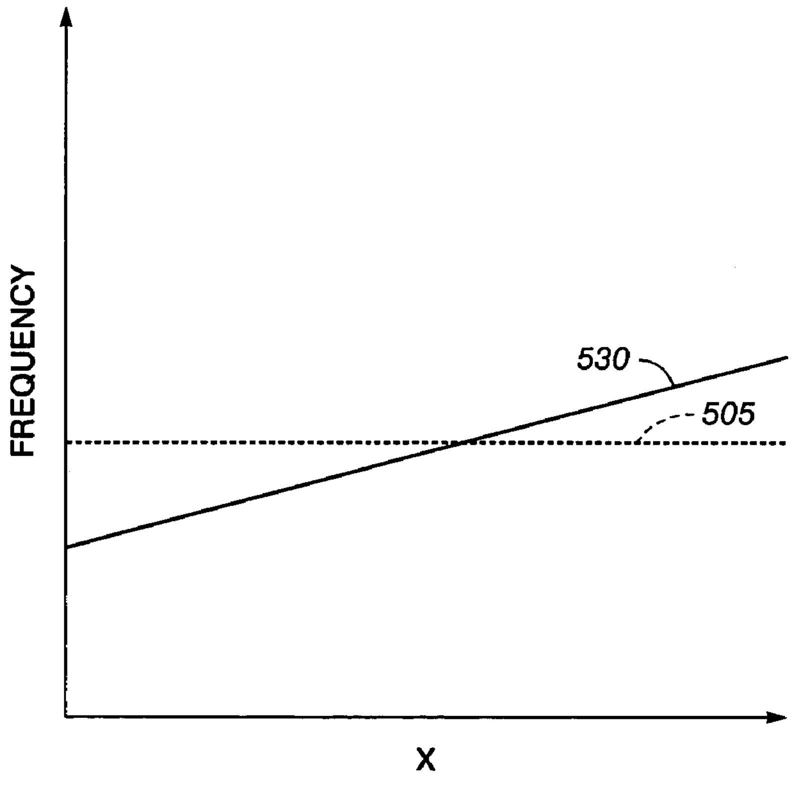
FIG. 9 illustrates another comparison between a measured frequency and a reference frequency as a function of cross process position according to this invention.

FIG. 9 illustrates a comparison between another measured frequency 530 and a reference constant frequency 505. As shown in FIG. 9, the measured frequency 530 increases from a value lower than that of the reference constant frequency 505, to a value that is larger than that of the reference constant frequency 505. This measured increasing frequency corresponds to a U-shaped bow.

Figure 10:
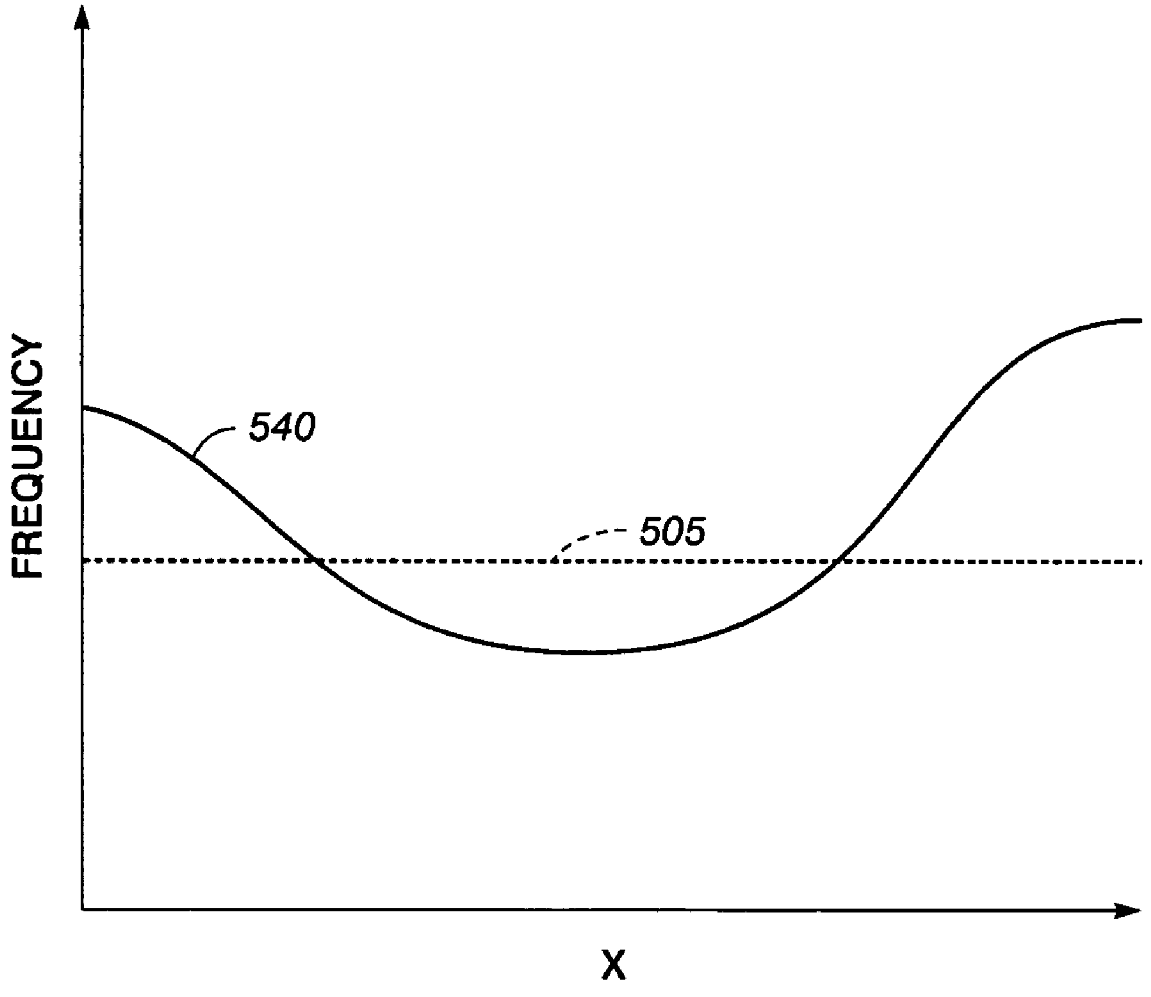
FIG. 10 illustrates another comparison between a measured frequency and a reference frequency as a function of cross process position according to this invention.

FIG. 10 illustrates another comparison between a measured frequency 540 and a reference constant frequency 505. As shown in FIG. 10, the measured frequency 540 decreases from a value greater than that of the reference constant frequency 505 to a value smaller than that of the reference constant frequency 505. Then, the measured frequency 540 increases to another value that is greater than that of the reference constant frequency 505. This measured wavy frequency corresponds to a bow of higher order distortion, as discussed above.

The detected skew and bow may be used for correction and adjustment. In various exemplary embodiment, these errors are measured at manufacturing during the alignment of the raster optical scanner with the rest of the marking engine. In various other exemplary embodiments, these errors are measured dynamically during the operation of the printer. The measurements and adjustments may be repeated during the life of the printer. The adjustment may be made manually or automatically. In various exemplary embodiments, the adjustment is made automatically by mechanically adjusting the position of the raster optical scanner.

Figure 11:
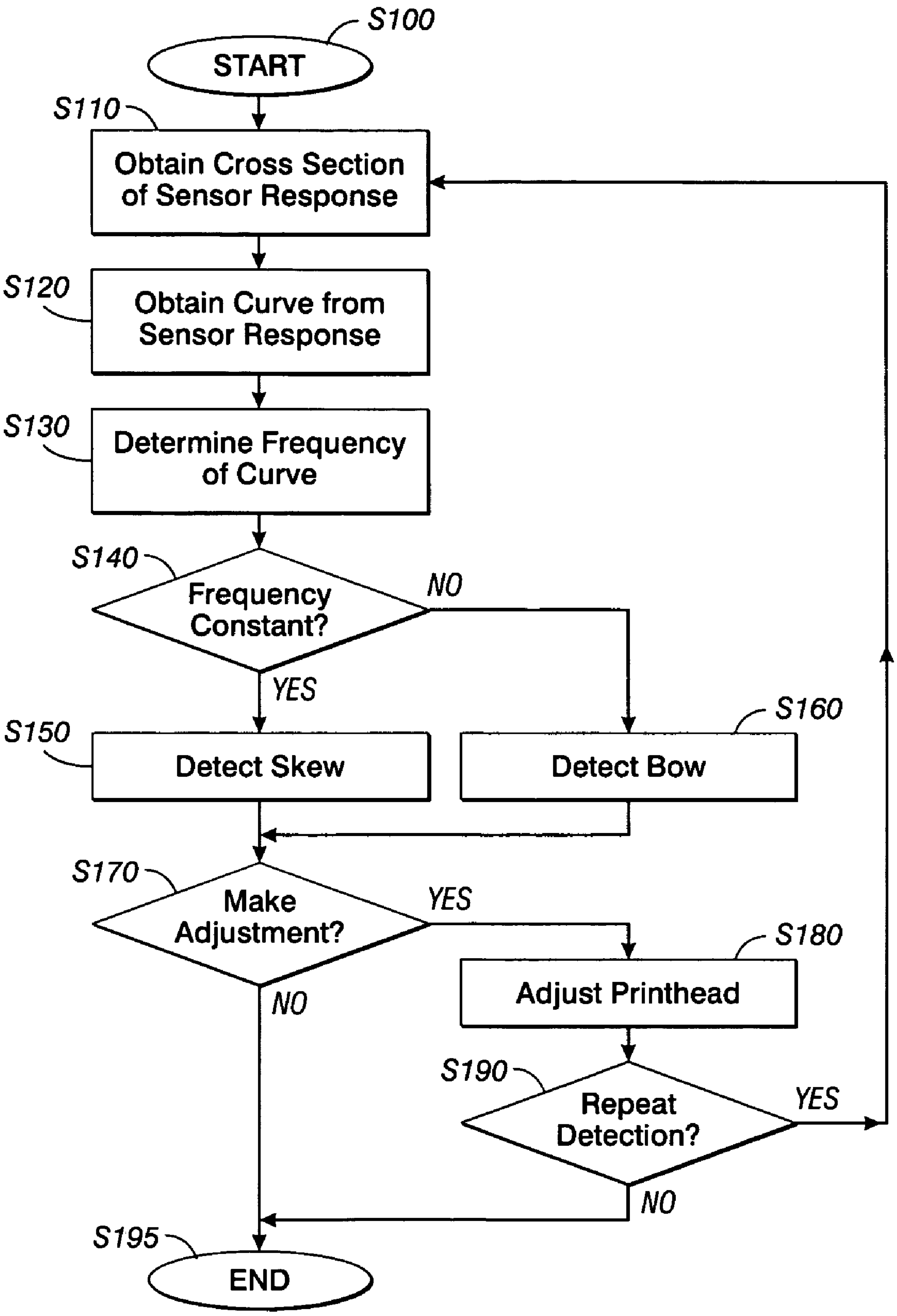
FIG. 11 is a flowchart outlining one exemplary embodiment of a method for detecting raster optical scanner misalignments according to this invention.

FIG. 11 is a flowchart outlining an exemplary embodiment of a method for detecting raster optical scanner misalignment according to this invention. As shown in FIG. 11, starting from step S100, operation of the method continues to step S110 to obtain a cross section of sensor response. Next, in step S120, a dash minimum response curve is obtained from the sensor response. Then, a frequency is determined for the dash minimum response curve. Operation of the method then proceeds to step S140.

In step S140, a determination is made whether the frequency is a constant. If it is determined that the frequency is a constant in step S140, operation of the method proceeds to step S150, where raster optical scanner skew is detected. Then, operation of the method proceeds to step S170, where the method ends.

On the other hand, if it is determined in step S140 that the frequency is not a constant, operation of the method proceeds to step S160, where raster optical scanner bow is detected. Thereafter, operation of the method proceeds to step S170.

In step S170, a determination is made whether to adjust the raster optical scanner. If it is determined in step S170 to adjust the raster optical scanner, operation continues to step S180. If not, operation proceeds to step S195.

In step S180, the raster optical scanner is adjusted to reduce, correct, eliminate or minimize errors. Then, operation continues to step S190.

In step S190, a determination is made whether to detect errors again. If it is determined in step S190 to detect errors again, operation jumps back to step S110, where the detection process gets repeated. If not, operation proceeds to step S195, where operation of the method ends.

Figure 12:
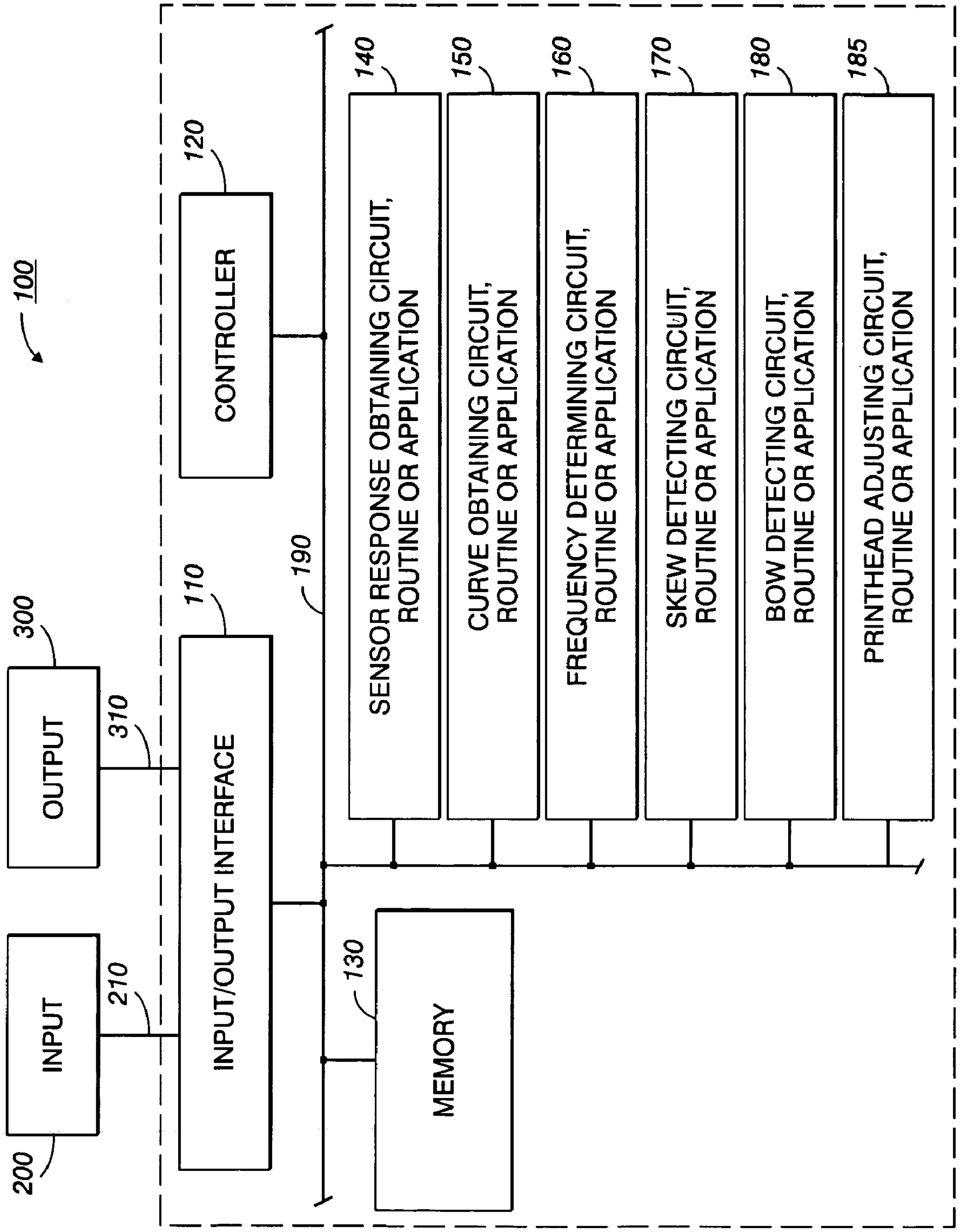
FIG. 12 is a functional block diagram of an exemplary embodiment of a misalignment detecting system according to this invention.

FIG. 12 is a functional block diagram of an exemplary embodiment of a raster optical scanner misalignment detecting system according to this invention. As shown in FIG. 12, the system 100 may include an input/output (I/O) interface 110, a controller 120, a memory 130, a sensor response obtaining circuit, routine or application 140, a dash minimum response curve obtaining circuit, routine or application 150, a frequency determining circuit, routine or application 160, a skew detecting circuit, routine or application 170, a bow detecting circuit, routine or application 180, and a raster optical scanner adjusting circuit, routine or application 185, each interconnected by one or more control and/or data buses and/or application programming interface 190.

In various exemplary embodiments, the system 100 is implemented on a programmable general purpose computer. However, the system 100 can also be implemented on a special purpose computer, a programmed microprocessor or microcontroller and peripheral integrated circuit elements, an ASIC or other integrated circuits, a digital signal processor (DSP), a hard wired electronic or logic circuit, such as a discrete element circuit, a programmable logical device such as a PLD, PLA, FPGA or PAL, or the like. In general, any device capable of implementing a finite state machine that is in turn capable of implementing the flowchart shown in FIG. 11 can be used to implement the system 100.

The input/output interface 110 interacts with the outside of the system 100. In various exemplary embodiments, the input/output interface 110 may receive input from input 200, via one or more links 210. The input/output interface 110 may output data to output 300 via one or more links 310.

The memory 130 may also store any data and/or program necessary for implementing the functions of the 100. The memory 130 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and a disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

As shown in FIG. 12, the sensor response obtaining circuit, routine or application 140, under control of the controller 120, obtains sensor response through the input/output interface 110. The dash minimum response curve obtaining circuit, routine or application 150, under the control of the controller 120, obtains a sinusoidal curve from the sensor response. The frequency determining circuit, routine or application 160, under control of the controller 120, determines a frequency for the dash minimum response curve, and determines whether the frequency is a constant.

When the frequency is a constant, the controller 120 directs the skew detecting circuit, routine or application 170 to detect skew. In various exemplary embodiments, the skew detecting circuit, routine or application 170 detects skew using a reference constant frequency.

When the frequency determined by the frequency determining circuit, routine or application 160 is not a constant, the controller 120 instructs the bow detecting circuit, routine or application 180 to detect bow. In various exemplary embodiments, the bow detecting circuit, routine or application 180 detects bow using a reference constant frequency.

In various exemplary embodiments, the controller 120 instructs the skew detecting circuit, routine or application 170 and the bow detecting circuit, routine or application 180 to output detected skew or bow to the output 300 for subsequent misalignment correction.

In various exemplary embodiments, the raster optical scanner adjusting circuit, routine or application 185, under control of the controller 120, makes adjustment to a raster optical scanner. The controller 120 may instruct the sensor response obtaining circuit, routine or application 140, the dash minimum response curve obtaining circuit, routine or application 150, the frequency determining circuit, routine or application 160, the skew detecting circuit, routine or application 170, and the bow detecting circuit, routine or application 180 to repeat the error detection after the adjustment.

In various exemplary embodiments, the sensor response obtaining circuit, routine or application 140, the dash minimum response curve obtaining circuit, routine or application 150, the frequency determining circuit, routine or application 160, the skew detecting circuit, routine or application 170, the bow detecting circuit, routine or application 180, and the raster optical scanner adjusting circuit, routine or application 185 obtain data from and/or send data to the memory 130.

The method illustrated in FIG. 11 may be implemented in a computer program product that can be executed on a computer. The computer program product may be a computer-readable recording medium on which a control program is recorded, or it may be a transmittable carrier wave in which the control program is embodied as a data signal.

While particular embodiments have been described, alternatives, modifications, variations and improvements may be implemented within the spirit and scope in the invention.

What is claimed is:

1. A method for detecting misalignment in a raster optical scanner, comprising:

obtaining a dash minimum response curve, the dash minimum response curve outlining a plurality of responses having minimal values sensed from a plurality of dashes in a test pattern;

obtaining a frequency of the dash minimum response curve;

determining whether the frequency is a constant;

determining raster optical scanner skew or bow based on the determination whether the frequency is a constant; and detecting misalignment in the raster optical scanner based on the determined skew or bow.

2. The method of claim 1, when the frequency is determined as a constant, the method further comprising:

determining a difference between the frequency and a reference value; and determining raster optical scanner skew based on the difference.

3. The method of claim 2, further comprising:

determining an amount and an angle of the raster optical scanner skew based on the difference.

4. The method of claim 1, when the frequency is determined not as a constant, the method further comprising:

determining a variation of the frequency; and determining raster optical scanner bow based on the variation.

5. The method of claim 4, further comprising:

determining a high order distortion of the raster optical scanner based on the variation.

6. The method of claim 1, the plurality of dashes in the test pattern being spaced from each other at a substantially equal distance in a cross process direction, each dash extending substantially a same length in a process direction, at least one dash having a position shift in the process direction from a neighboring dash.

7. The method of claim 1, further comprising:

adjusting the position of the raster optical scanner.

8. A computer-readable medium having computer-executable instructions for performing the method of claim 1.

9. A method for detecting misalignment in a raster optical scanner, comprising:

obtaining a dash minimum response curve, the dash minimum response curve being a table of metrics of attenuation of a sensor response signal sensed from each dash sequence from a plurality of dashes in a test pattern;

obtaining a metric of the attenuation due to a presence of a dash, wherein the metric representing one or more of a minimal response sensed from the dashes, a full width half maximum of an attenuation curve, an integrated response change in an attenuation profile;

determining raster optical scanner skew or bow based on the obtained metric; and detecting misalignment in the raster optical scanner based on the determined skew or bow.

10. A computer-readable medium having computer-executable instructions for performing the method of claim 9.

11. An apparatus for detecting misalignment in a raster optical scanner, comprising:

a dash minimum response curve obtaining circuit, routine or application that obtains a dash minimum response curve, the dash minimum response curve outlining a plurality of responses having minimal values sensed from a plurality of dashes in a test pattern;

a frequency determining circuit, routine or application that obtains a frequency of the dash minimum response curve; and an error detecting circuit, routine or application that determines whether the frequency is a constant.

12. The apparatus of claim 11, wherein the error detecting circuit, routine or application comprises a skew detecting circuit, routine or application, wherein, when the frequency determining circuit, routine or application determines that the frequency is a constant, the skew detecting circuit, routine or application determines a difference between the frequency and a reference value, and determines raster optical scanner skew based on the difference.

13. The apparatus of claim 12, wherein the skew detecting circuit, routine or application further determines an amount and an angle of the raster optical scanner skew based on the difference.

14. The apparatus of claim 11, wherein the error detecting circuit, routine or application comprises a bow detecting circuit, routine or application, wherein, when the frequency determining circuit, routine or application determines that the frequency is not a constant, the bow detecting circuit, routine or application determines a variation of the frequency, and determines raster optical scanner bow based on the variation.

15. The apparatus of claim 11, wherein the bow detecting circuit, routine or application determines a high order distortion of the raster optical scanner based on the variation.

16. The apparatus of claim 11, the plurality of dashes in the test pattern being spaced from each other at a substantially equal distance in a cross process direction, each dash extending substantially a same length in a process direction, at least one dash having a position shift in the process direction from a neighboring dash.

17. The apparatus of claim 11, further comprising:

an adjusting circuit, routine or application that adjusts the raster optical scanner.

18. The apparatus of claim 11, further comprising:

a sensor response obtaining circuit, routine or application that obtains the plurality of responses having minimal values.

19. A raster optical scanner including the apparatus of claim 11.

20. A xerographic marking device including the apparatus of claim 11.

* * * * *